US012718321B2

(12) United States Patent
Kim et al.

(10) Patent No.: US 12,718,321 B2
(45) Date of Patent: Aug. 25, 2026

(54) DEEP-LEARNING-BASED SUPER-RESOLUTION IMAGE PROCESSING SYSTEM AND METHOD, AND COMPUTER PROGRAM FOR SAME

(71) Applicants: KOREA UNIVERSITY RESEARCH AND BUSINESS FOUNDATION, Seoul (KR); JEJU NATIONALUNIVERSITY INDUSTRY-ACADEMIC COOPERATION FOUNDATION, Jeju-si (KR)

(72) Inventors: Joongheon Kim, Seoul (KR); Yeongeun Kang, Seoul (KR); Soo Hyun Park, Incheon (KR); Minseok Choi, Jeju-si (KR)

(73) Assignees: KOREA UNIVERSITY RESEARCH AND BUSINESS FOUNDATION, Seoul (KR); JEJU NATIONAL UNIVERSITY INDUSTRY-ACADEMIC COOPERATION FOUNDATION, Jeju-si (KR)

( * ) Notice: Subject to any disclaimer, the term of this patent is extended or adjusted under 35 U.S.C. 154(b) by 462 days.

(21) Appl. No.: 18/275,127

(22) PCT Filed: Dec. 1, 2021

(86) PCT No.: PCT/KR2021/017974
§ 371 (c)(1),
(2) Date: Jan. 29, 2024

(87) PCT Pub. No.: WO2022/164001
PCT Pub. Date: Aug. 4, 2022

(65) Prior Publication Data

US 2025/0342560 A1 Nov. 6, 2025

(30) Foreign Application Priority Data

Feb. 1, 2021 (KR) ........................ 10-2021-0014331

(51) Int. Cl.
*G06K 9/32* (2006.01)
*G06T 3/4053* (2024.01)
*G06V 20/17* (2022.01)

(52) U.S. Cl.
CPC ............ *G06T 3/4053* (2013.01); *G06V 20/17* (2022.01)

(58) Field of Classification Search
CPC ..................... G06T 3/4053; G06T 3/40; G06T 2207/20016; G06T 2207/20081;
(Continued)

(56) References Cited

U.S. PATENT DOCUMENTS

2017/0171319 A1* 6/2017 Hall ...................... H04L 67/108

FOREIGN PATENT DOCUMENTS

KR 10-2013-0073770 A 7/2013
KR 10-2018-0094348 A 8/2018
(Continued)

OTHER PUBLICATIONS

Kim et al. ("Quality-Aware Streaming and Scheduling for Device-to-Device Video Delivery", IEEE/ACM Transactions on Networking, vol. 24, No. 4, Aug. 2016, pp. 2319-2331) (Year: 2016).*
(Continued)

*Primary Examiner* — Duy M Dang
(74) *Attorney, Agent, or Firm* — NSIP Law

(57) ABSTRACT

A deep learning-based super-resolution image processing system may comprise an unmanned aerial vehicle system configured to receive an image captured by an unmanned aerial vehicle and allocate the received image data to a transmission queue for transmission; and a Mobile Edge
(Continued)

Computing (MEC) center including one or more transceivers each having a reception queue, and configured to receive the image data from the unmanned aerial vehicle system through the one or more transceivers and generate a super-resolution image corresponding to the image data through a deep learning computation based on a super-resolution model. The unmanned aerial vehicle system may determine which transceiver to transmit the image data based on a data amount difference between the transmission queue and the reception queue. In addition, the MEC center may determine which super-resolution model to apply to the image data such that a time-averaged super-resolution performance defined by Lyapunov optimization is maximized using a quality evaluation value when the super-resolution model has been applied to the image data and a queue stability value of the reception queue.

13 Claims, 10 Drawing Sheets

(58) Field of Classification Search
CPC .......... G06T 2207/20084; G06V 20/17; H04L 47/00; H04L 47/6255
See application file for complete search history.

(56) References Cited

FOREIGN PATENT DOCUMENTS

| | | | |
|---|---|---|---|
| KR | 10-2019-0030589 | A | 3/2019 |
| KR | 10-2019-0105539 | A | 9/2019 |
| KR | 10-2019-0122463 | A | 10/2019 |
| KR | 10-2036136 | B1 | 10/2019 |
| KR | 10-2020-0020610 | A | 7/2020 |
| KR | 10-2019-0104705 | A | 4/2021 |
| WO | WO 2019/112616 | A1 | 6/2019 |

OTHER PUBLICATIONS

Kim, Dohyeon, et al., "A Reliable, Self-Adaptive Face Identification Framework via Lyapunov Optimization," Workshop on AI Systems at Symposium on Operation Systems Principles, Oct. 28, 2017 (2 Pages in English).

Park, Soohyun et al., "Self-Controllable Super-Resolution Deep Learning Framework for Surveillance Drones in Security Applications," EAI Endorsed Transactions on Security and Safety, vol. 7, Issue 23, Jun. 30, 2020, (7 Pages in English).

* cited by examiner

DEEP-LEARNING-BASED SUPER-RESOLUTION IMAGE PROCESSING SYSTEM AND METHOD, AND COMPUTER PROGRAM FOR SAME

CROSS REFERENCE TO RELATED APPLICATIONS

This application is a U.S. National Stage Application of International Application No. PCT/KR2021/017974, filed on Dec. 1, 2021, which claims the benefit under 35 USC 119(a) and 365(b) of Korean Patent Application No. 10-2021-0014331, filed on Feb. 1, 2021, in the Korean Intellectual Property Office, the entire disclosure of which is incorporated herein by reference for all purposes.

TECHNICAL FIELD

Embodiments relate to a system and method for processing super-resolution images based on a deep learning, and a computer program therefor. More specifically, the embodiments relate to technologies for implementing adaptive and stabilized image recovery by selecting a method of allocating multiple drones and mobile edge computing (MEC) centers and a deep learning model that optimizes the queue stability and processing performance of the MEC centers, in performing surveillance, detection and the like by applying a super-resolution technique to image data of the drones in a smart port environment and the like.

BACKGROUND ART

In order to operate and maintain a large-scale smart logistics system, many closed-circuit television (CCTV) cameras must be placed and the data collected by the CCTV cameras must be forwarded to a centralized monitoring center, resulting in significantly necessary expenses in monitoring and surveillance. Therefore, in constructing a CCTV system, optimizing the flow of data is considered as a very important problem.

Among methods of efficiently handling the problem of CCTV camera placement, there is a method of simply using an unmanned aerial vehicle, that is, a drone. In case that a CCTV camera is mounted on an aerial drone for surveillance purpose, determining a location is flexible and easy due to the nature of the aerial vehicle and thereby enables monitoring in a groundbreaking way in a large-scale smart logistics system.

To realize a drone-based surveillance system, all drones and related components must be connected at all times and thus, an Internet of Things (IoT) technology is essential. In addition, the CCTV camera mounted on the drone captures the surrounding environment and transmits the captured data, using image or video stream, to a mobile edge computing (Multi-Access Edge Computing: MEC) center which is a station on the ground through a wireless access medium such as 5G mmWave channel or LTE.

However, because a drone has a high mobility and its position is dynamically updated, the transmission quality of the wireless connection between a drone in the air and the MEC center on the ground is not stable enough to transmit video signals all the time.

Accordingly, a method is used in which in order to make wireless transmission faster and safer in terms of transmission quality, a drone first compresses an image and video stream although such compression may cause a certain amount of image and video quality loss and then transmits the compressed stream to the MEC center over a radio channel and the MEC center recovers the quality of the image and video stream using a super-resolution algorithm.

However, the above-mentioned conventional method uses a single static super-resolution framework that uses a once-determined super-resolution model all through system operation, and thus there is a problem incapable of controlling the arrival of real-timely changing image and video stream from the drone.

PRIOR ART

Patent Document 1: Korean Patent Laid-Open Publication No. 10-2019-0105539

Technical Problems to be Solved by the Invention

According to one aspect of the present invention, it is possible to provide a system and method for processing super-resolution images based on a deep learning and a computer program therefor which can fully utilize a super-resolution deep learning framework by selecting an appropriate model from among various super-resolution models in accordance with the time delay in performing surveillance, detection and the like by applying a super-resolution technique to image data of the drones in a smart port environment and the like.

The technical problems of the present invention are not limited to the above-mentioned technical problems, and other technical problems not mentioned will be clearly understood by those skilled in the art from the description below.

Means of Solving the Problems

A deep learning-based super-resolution image processing system according to one aspect of the present invention comprises: an unmanned aerial vehicle system configured to receive an image captured by an unmanned aerial vehicle and allocate the received image data to a transmission queue for transmission; and a Mobile Edge Computing (MEC) center including one or more transceivers each having a reception queue and configured to receive the image data from the unmanned aerial vehicle system through the one or more transceivers and generate a super-resolution image corresponding to the image data through a deep learning computation based on a super-resolution model. The unmanned aerial vehicle system is further configured to determine which transceiver to transmit the image data based on a data amount difference between the transmission queue and the reception queue.

In one embodiment, the unmanned aerial vehicle system includes an input unit configured to receive the image from a photographing means; and a transmission unit including the transmission queue and configured to determine which transceiver to transmit the image data by means of a scheduling using a difference between the amount of data in the backlog of the transmission queue and the amount of data in the backlog of the reception queue as a weight.

In one embodiment, the unmanned aerial vehicle system further includes a layering unit configured to generate the image data to be allocated to the transmission queue through layering for the image received by the input unit.

In one embodiment, the mobile edge computing center includes a super-resolution module configured to determine a super-resolution model to be applied to the image data received through the reception queue based on the free space of the reception queue, and generate the super-resolution image using the determined super-resolution model.

In one embodiment, the super-resolution module includes a storage unit configured to store a plurality of super-resolution models that differ in at least one of processing speed and processing quality; and a control unit configured to determine which super-resolution model to be applied to the image data from among the plurality of super-resolution models so as to maximize time-averaged super-resolution performance for the image data.

In one embodiment, the control unit is further configured to determine which super-resolution model to apply to the image data such that a time-averaged super-resolution performance defined by Lyapunov optimization is maximized using a quality evaluation value when the super-resolution model has been applied to the image data and a queue stability value of the reception queue.

A deep learning-based super-resolution image processing method according to an aspect of the present invention comprises the steps of: receiving a captured image by an unmanned aerial vehicle system; allocating, by the unmanned aerial vehicle system, image data corresponding to the captured image to a transmission queue; receiving, by the unmanned aerial vehicle system, state information of a reception queue of one or more transceivers included in a mobile edge computing center for generating a super-resolution image corresponding to the image data through a deep learning computation based on a super-resolution model; determining, by the unmanned aerial vehicle system, which transceiver to transmit the image data based on data amount difference between the transmission queue and the reception queue; and transmitting, by the unmanned aerial vehicle system, the image data to the determined transceiver.

In one embodiment, the step of determining which transceiver to transmit the image data includes scheduling using the difference between the amount of data in the backlog of the transmission queue and the amount of data in the backlog of the reception queue as a weight.

The deep learning-based super-resolution image processing method according to an embodiment further includes the step of, prior to allocating the image data to the transmission queue, generating, by the unmanned aerial vehicle system, the image data to be assigned to the transmission queue through layering for the captured image.

A deep learning-based super-resolution image processing method according to another aspect of the present invention comprises the steps of: receiving, by a mobile edge computing center including one or more transceivers each having a reception queue, image data from an unmanned aerial vehicle system through the one or more transceivers; determining, by the mobile edge computing center, which super-resolution model to be applied to the image data received through the reception queue based on a free space of each of the one or more reception queues; and generating, by the mobile edge computing center, a super-resolution image corresponding to the image data through a deep learning computation based on the determined super-resolution model.

The deep learning-based super-resolution image processing method according to an embodiment further comprises the step of storing a plurality of super-resolution models different in at least one of processing speed and processing quality in the mobile edge computing center, wherein the step of determining which super-resolution model to be applied to the image data includes determining, by the mobile edge computing center, a super-resolution model to be applied to the image data from among the plurality of super-resolution models so as to maximize a time-averaged super-resolution performance for the image data.

Also, in one embodiment, the step of determining a super-resolution model to be applied to the image data among the plurality of super-resolution models includes determining, by the mobile edge computing center, a super-resolution model maximizing the time-averaged super-resolution performance defined by Lyapunov optimization using a quality evaluation value and a queue stability value of the reception queue when the super-resolution model has been applied to the image data.

A computer program according to one aspect of the present invention is combined with hardware to execute the deep learning-based super-resolution image processing method according to the above-described embodiments and may be stored in a computer-readable recording medium.

Effects of Invention

According to the deep learning-based super-resolution image processing system and method according to the embodiments, there is an advantage of maximizing the time-averaged performance while maintaining the stability of the system by dynamically selecting an appropriate model from among several super-resolution models in accordance with the situation changing in real time, in performing surveillance, detection and the like by applying super-resolution technology to image data of a drone in a smart port environment and the like.

According to the deep learning-based super-resolution image processing system and method according to an embodiment, a queue backlog difference which is advantageous in terms of queue stability that is one of the main objects of the present invention can be taken into account through a max-weight scheduling. In addition, if the hardware itself is limited in terms of performance or resources, such as a mobile device, the processing speed is limitative, but according to the deep learning-based super-resolution image processing system and method according to an embodiment, a time-averaged super-resolution performance according to stability can be maximized through a self-adaptive control for the super-resolution framework.

Since a great damage can be caused in terms of surveillance and security if information loss occurs due to overflow, a stabilized control is essentially important. According to the deep learning-based super-resolution image processing system and method according to an embodiment, if the number of super-resolution models is N, only algorithmic computation with a computational complexity of O(N) are required and thus the complexity is low, and the model is automatically adjusted in accordance with the given hardware or system and thus a trial and error adjustment by a system engineer is not required. Therefore, there is an advantage of maximizing efficiency while maintaining the stability of self-adaptation.

Effects of the present invention are not limited to the effects mentioned above, and other effects not mentioned will be clearly understood by those skilled in the art from the description below.

DETAILED DESCRIPTION

Hereinafter, the embodiments of the present invention will be described in detail with reference to the drawings.

Figure 1:
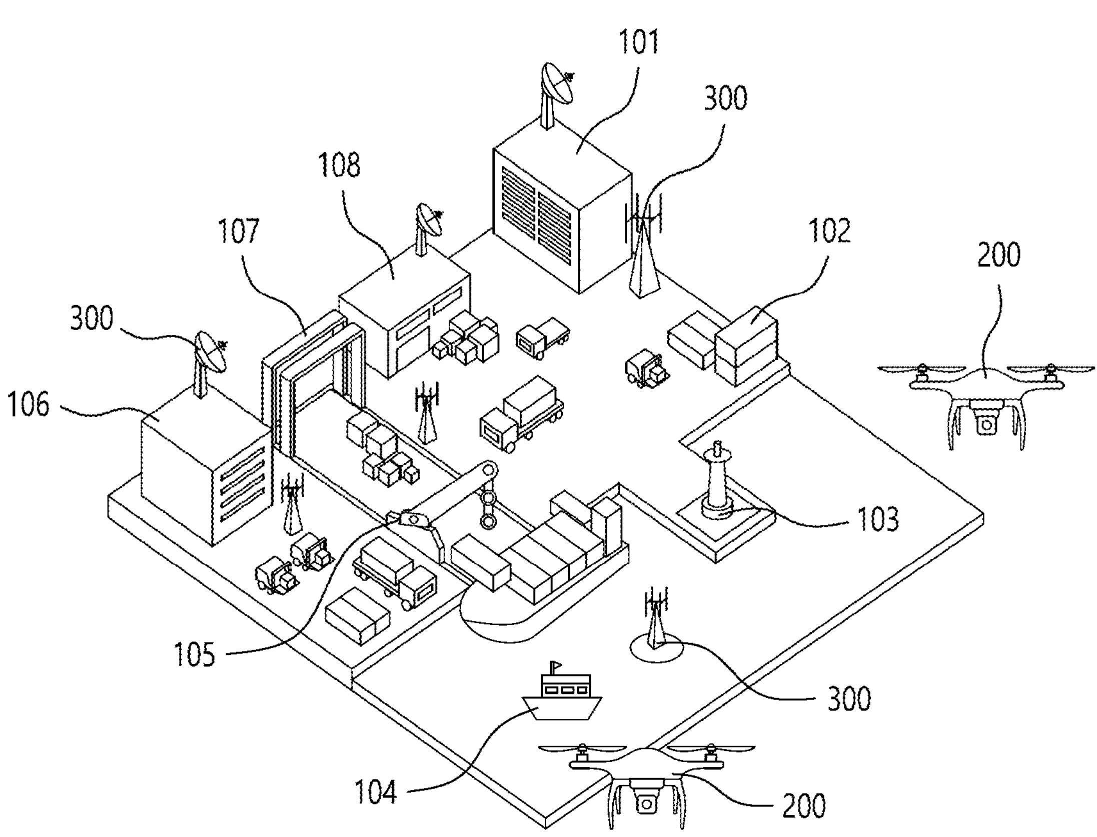
FIG. 1 is a conceptual diagram of an exemplary environment to which a deep learning-based super-resolution image processing system according to an embodiment is applied.

FIG. 1 is a conceptual diagram of an exemplary environment to which a deep learning-based super-resolution image processing system according to an embodiment is applied and a smart port logistics system. However, the environment to which the embodiments can be applied is not limited to the port logistics system.

As shown in FIG. 1, the smart port logistics system may be made up of a number of key components such as a port management center 101, a smart container 102, a smart lighthouse 103, an autonomous ship 104, a smart crane 105, an integrated control center 106, a smart container crane 107, a smart transportation means 108 and the like. In addition, the smart port logistics system may include one or more mobile edge computing (Multi-Access Edge Computing; MEC) centers 300. Individual components included in the smart port logistics system may be connected through Internet of Things (IoT)-based wireless or wired communication links. The port management center 101 may control the entire smart port logistics system based on this real-time information sharing.

In order to observe and monitor this port logistics system, one or more unmanned aerial vehicles, for example, a drone 200 may be used. Since the drone 200 can fly unmanned and flexibly update surveillance locations, it is cost-effective compared to a static surveillance means such as closed-circuit television (CCTV). In this environment, the MEC center 300 is used to receive surveillance information recorded by the drone 200. Each MEC center 300 may receive image data from the drone 200 and enhance the quality of the image data using a super-resolution deep learning framework. In addition, the MEC center 300 may transmit the quality-enhanced image data to a surveillance center such as the port management center 101 or the integrated control center 106.

In this specification, the image may be a still image such as a photograph, but may also be a series of images that are continuous in time series like moving pictures. An environment to which embodiments of the present invention are applied involves communication between an unmanned aerial vehicle such as a drone 200 and the MEC center 300 for efficient and flexible surveillance and quality improvement of surveillance information, wherein the deep learning-based super-resolution image processing system is implemented through an unmanned aerial vehicle system applied to the drone 200 and/or the MEC center 300.

Figure 2:
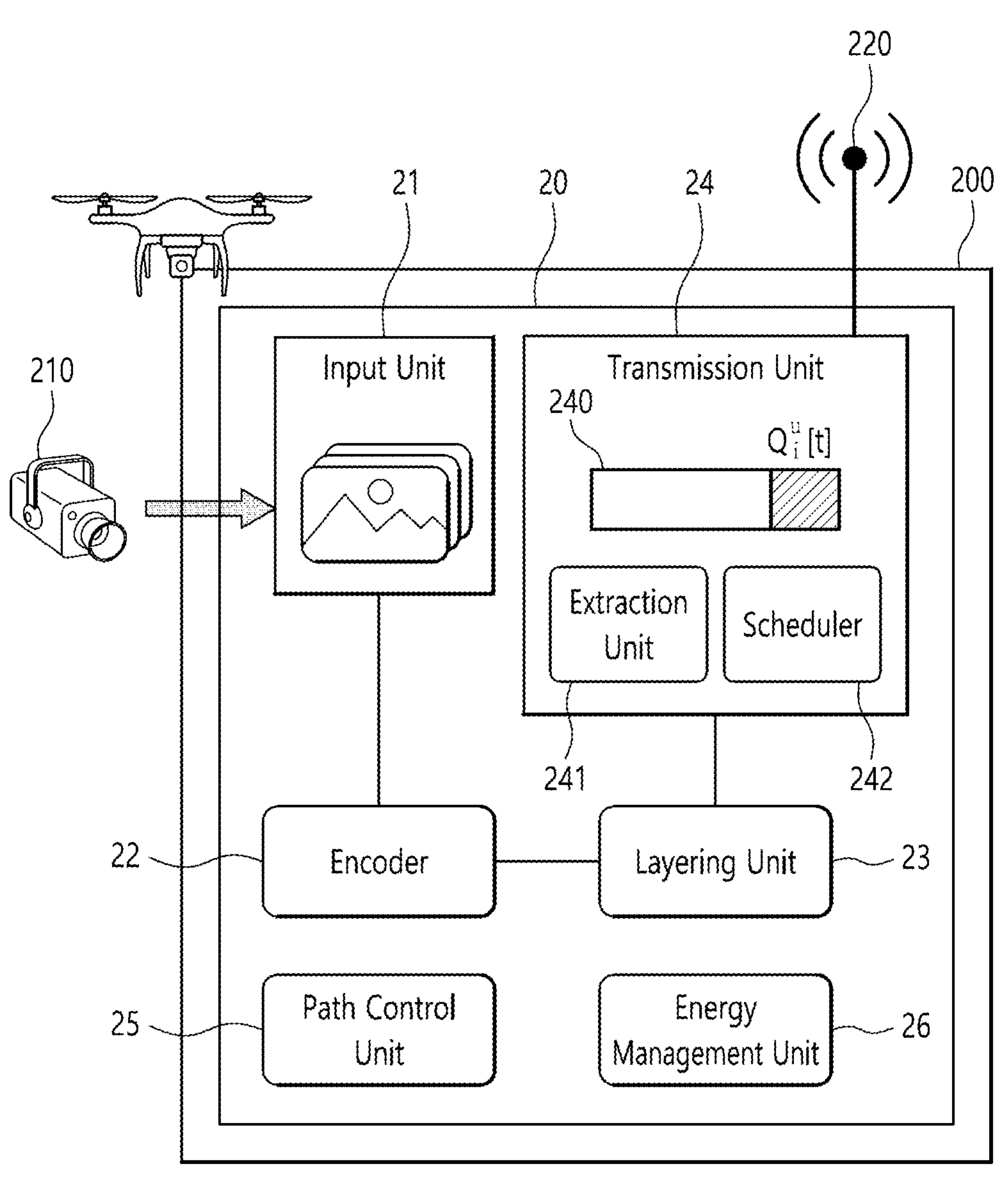
FIG. 2 is a schematic block diagram of an unmanned aerial vehicle system in a deep learning-based super-resolution image processing system according to an embodiment.

FIG. 2 is a schematic block diagram of an unmanned aerial vehicle system in a deep learning-based super-resolution image processing system according to an embodiment.

Referring to FIG. 2, the unmanned aerial vehicle system 20 of this embodiment is for transmitting image data obtained by the drone 200 and may be implemented as an internal system of the drone 200 or implemented as a system capable of communicating with the drone in a short-range communication way. In one embodiment, the unmanned aerial vehicle system 20 may include an input unit 21 and a transmission unit 24. Also, in one embodiment, the unmanned aerial vehicle system 20 may further include an encoder 22. Furthermore, in one embodiment, the unmanned aerial vehicle system 20 may further include a layering unit 23.

The system, device and server described herein may have aspects that are entirely hardware or partly hardware and partly software. For example, the systems, devices, servers and respective units included therein in the present specification may collectively refer to hardware and related software for processing data of a specific format and content and/or exchanging the data in an electronic communication way. In this specification, terms such as "unit", "module", "device", "terminal", "server" or "system" are intended to refer to a combination of hardware and software driven by the corresponding hardware. For example, the hardware may be a data processing device including a CPU or other processor. Also, software driven by hardware may refer to a running process, an object, an executable file, a thread of execution, a program and the like.

In addition, respective elements constituting the unmanned aerial vehicle system 21 to 26 according to this embodiment are not intended to refer to separate devices that are necessarily physically separated from each other. That is, the input unit 21, the encoder 22, the layering unit 23, the transmission unit 24 and the like of FIG. 1 functionally classify the hardware constituting the unmanned aerial vehicle system 20 in accordance with the operation performed by the corresponding hardware and it is not necessary that respective units be provided independently of each other. Of course, depending on embodiments, one or more of respective units of the unmanned aerial vehicle system 20 may be implemented as separate devices that are physically separated from each other.

The unmanned aerial vehicle system 20 configured as described above plays a role of transmitting an image corresponding to surveillance information to the MEC center. Information recorded for surveillance are encoded into image data by the unmanned aerial vehicle system 20, and the results may be layered for scalable encoding. The layered image data may then be transmitted over a radio channel. In this case, layers may be selectively transmitted due to limited radio channel bandwidth, and image data of each layer may be added to the backlog of transmission queue. Also, in order to transmit image data, the unmanned aerial vehicle system 20 may be scheduled and matched with the MEC center as described below.

On the other hand, the unmanned aerial vehicle system 20 may further include control modules for unmanned flight of the drone 200 such as a path control unit 25, an energy management unit 26 and the like. The path control unit 25 may function to set and adjust the flight path of the drone 200 so that the drone 200 surveils the environment to which the unmanned aerial vehicle system 20 according to the present embodiment has been applied (for example, surveillance area related to the smart port logistics system). In addition, the energy management unit 26 may function to monitor the remaining energy of a battery (not shown) provided in the drone 200 so that the drone 200 can sufficiently perform image capture while flying within the surveillance area, to set the path control unit for the drone to move to a charging location if the remaining energy is insufficient, and the like.

Figure 4A:
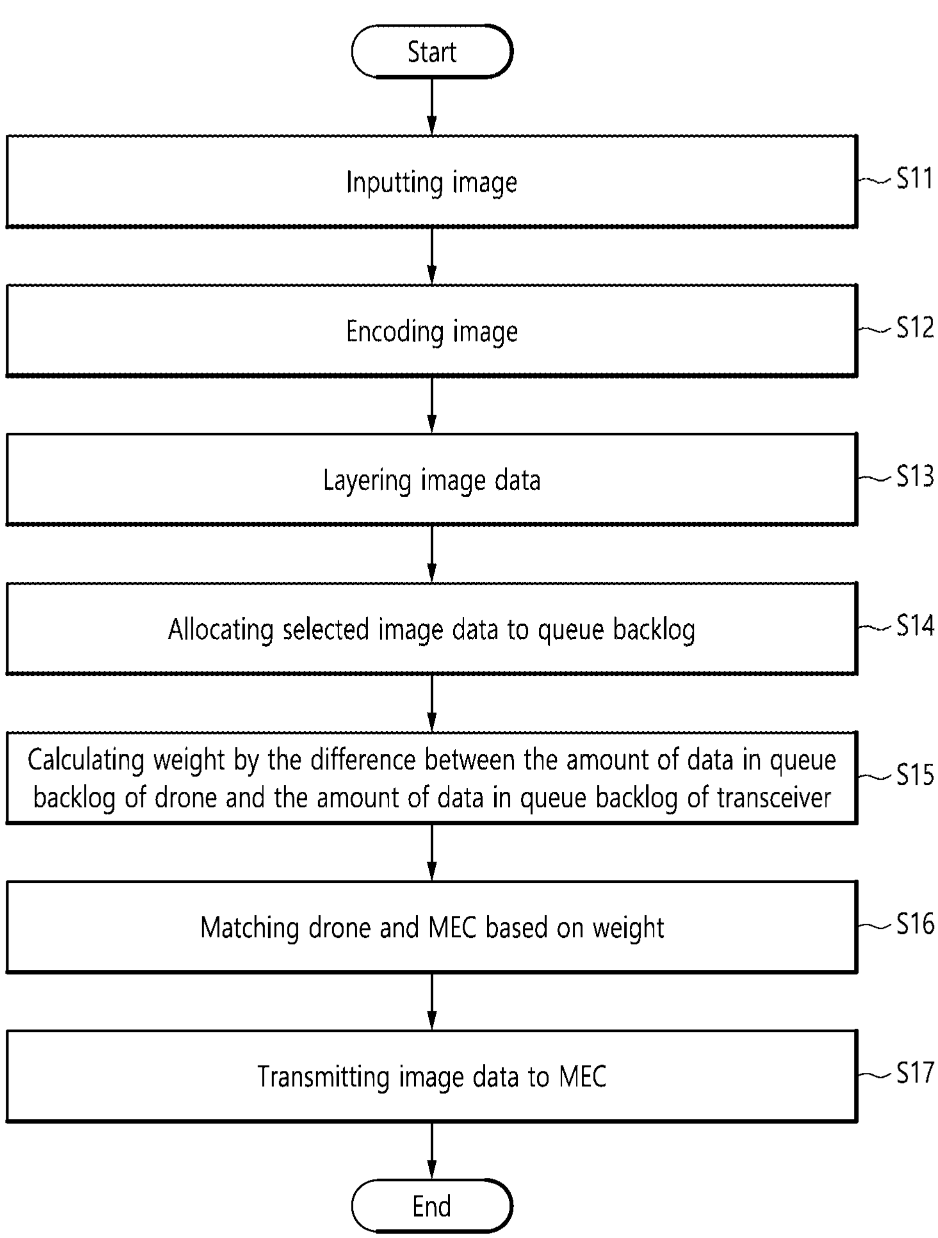
FIG. 4A is a flowchart illustrating each step of a process in which an unmanned aerial vehicle system transmits image data to an MEC center in a deep learning-based super-resolution image processing method according to an embodiment.

FIG. 4A is a flowchart illustrating each step of a process in which an unmanned aerial vehicle system transmits image data to an MEC center in a deep learning-based super-resolution image processing method according to an embodiment.

Referring to FIGS. 2 and 4A, the input unit 21 may receive a captured image from a photographing unit 210 such as a camera provided in the drone 200 (S11). In one embodiment, the encoder 22 may encode the captured image received by the input unit 21 into image data (S12). The encoding may use any data format known or to be developed in the future and is not limited to a specific format. Also, in one embodiment, the layering unit 23 may classify image data into bit-stream layers for scalable encoding and then layer them (S13).

Thereafter, the image data may be loaded into the backlog of the transmission queue 240 by allocating the image data to the transmission queue 240 of the transmission unit 24 (S14). In one embodiment, the extracting unit 241 of the transmission unit 24 may selectively extract layers generated by the layer unit 23 in order to transmit image data using a limited radio channel bandwidth. In addition, the scheduler 242 of the transmission unit 24 may transmit the data in the backlog of the transmission queue 240 to the transceiver of the MEC center, wherein the scheduler 242 may determine a transceiver of the MEC center to transmit image data by performing scheduling and matching using the difference between the amount of data in the backlog of the transmission queue 240 and the amount of data in the backlog of the reception queue of the transceiver to receive it as a weight (S15 and S16).

Specifically, in one embodiment, the scheduler 242 may perform the scheduling and matching based on Equation 1 below using the backlog of the transmission queue 240, the queue backlog of the transceiver of the MEC center to receive the image data and channel state information. Also, for the operations as described above, the unmanned aerial vehicle system 20 may receive queue state information of each transceiver of the MEC center in real time and/or periodically.

$$\max: \sum_{\forall j\in\mathcal{M}}\sum_{\forall i\in\mathcal{U}}\sum_{\forall k\in\mathcal{K}_j}\left(Q_i^u[t]-Q_{j,k}^m[t]\right)\cdot\left|h_{j,k}^i\right|\cdot x_{j,k}^i \qquad \text{Equation 1}$$

$$\text{s.t. } \sum_{\forall j\in\mathcal{M}}\sum_{\forall k\in\mathcal{K}_j} x_{j,k}^i \le 1,\ \forall\, i\in\mathcal{U},\ \forall\, j\in\mathcal{M}$$

$$\sum_{\forall j\in\mathcal{U}}\sum_{\forall k\in\mathcal{K}_j} x_{j,k}^i \le a_j,\ \forall\, j\in\mathcal{M}$$

Wherein U, M, Kj refer to the transceiver of the unmanned aerial vehicle system, the MEC center, and the j-th MEC center (or also denoted as MEC-j), respectively. For example, the transceiver of the MEC center may be an RF transceiver. Also, $$Q_i^u[t]$$

represents the backlog size of the transmission queue 240, that is, the amount of image data obtained by the drone using the photographing means 210. Also, $$Q_{j,k}^m[t]$$

represents the size of the queue backlog of the k-th transceiver of MEC-j.

On the other hand, in Equation 1, $$h_{j,k}^i$$

is the channel gain between the unmanned aerial vehicle system 20 of the i-th drone 200 (or, for simplicity, also referred to as drone i) and the k-th transceiver of MEC-j and has a value between 0 and 1. Also, in Equation 1, $\alpha_j$ represents the number of transceivers of MEC-j. Also, in Equation 1, $$x_{j,k}^i$$

is a scheduling index between drone i and the k-th transceiver of MEC-j. If drone i is going to transmit data in its own backlog to the k-th transceiver of MEC-j, $$x_{j,k}^i$$

has a value of 1, otherwise, $$x_{j,k}^i$$

is 0.

In this embodiment, the scheduler 242 performs scheduling and matching using the difference between the amount of data in the backlog of the transmission queue 240 and the amount of data in the backlog of the queue of the transceiver in the MEC center to receive the image data, that is, $$Q_i^u[t]-Q_{j,k}^m[t]$$

in the above Equation 1 as a weight. That is, when the amount of data in the backlog of the transmission queue 240 is greater than the amount of data in the backlog of the k-th transceiver of MEC-j, the weight for scheduling between the k-th transceiver of MEC-j and the drone i increases.

For example, when the backlog $$Q_i^u[t]$$

of transmission queue 240 of the drone i is in the overflow state, the image data should be delivered to one of the MEC centers to thereby prevent loss of the image data. Whereas, for a drone having the backlog size of the transmission queue 240 close to 0, system stability is not urgent. Alternatively, in case that the backlog $$Q_{j,k}^m[t]$$

of the reception queue of the k-th transceiver of MEC-j is close to the overflow state, an overflow occurs if additional data arrives at the corresponding transceiver and therefore, it is desirable for the corresponding transceiver to avoid connection with the unmanned aerial vehicle system. Whereas, if the backlog size of the queue of the transceiver of the MEC center is close to 0, a waiting space for receiving data from the unmanned aerial vehicle system 20 becomes sufficient, resulting in easy scheduling.

Thus, in this embodiment, the scheduling and matching for image data transmission between multiple drones and multiple MEC centers can be performed by using the queue backlog difference $$Q_i^u[t]-Q_{j,k}^m[t]$$

between the transmission unit 24 of the unmanned aerial vehicle system 20 and the transceiver of the MEC center as a reasonable weight.

The scheduling according to this embodiment described above is to maximize the sum of data transmitted from the drone to the MEC center in consideration of the channel state and the backlog state of the transceiver of the MEC center. In this embodiment, it was assumed that the unmanned aerial vehicle system 20 cannot simultaneously transmit data to a plurality of MEC centers due to hardware limitations such as the antenna 220 and that each MEC center can communicate with the unmanned aerial vehicle system 20 as many times as the number $\alpha_j$ of transceivers provided in the corresponding MEC center.

As described above, if the MEC center and transceiver to transmit the image data are determined, the transmission unit 24 can transmit the image data allocated to the transmission queue 240 to the corresponding MEC center (S17).

Figure 3:
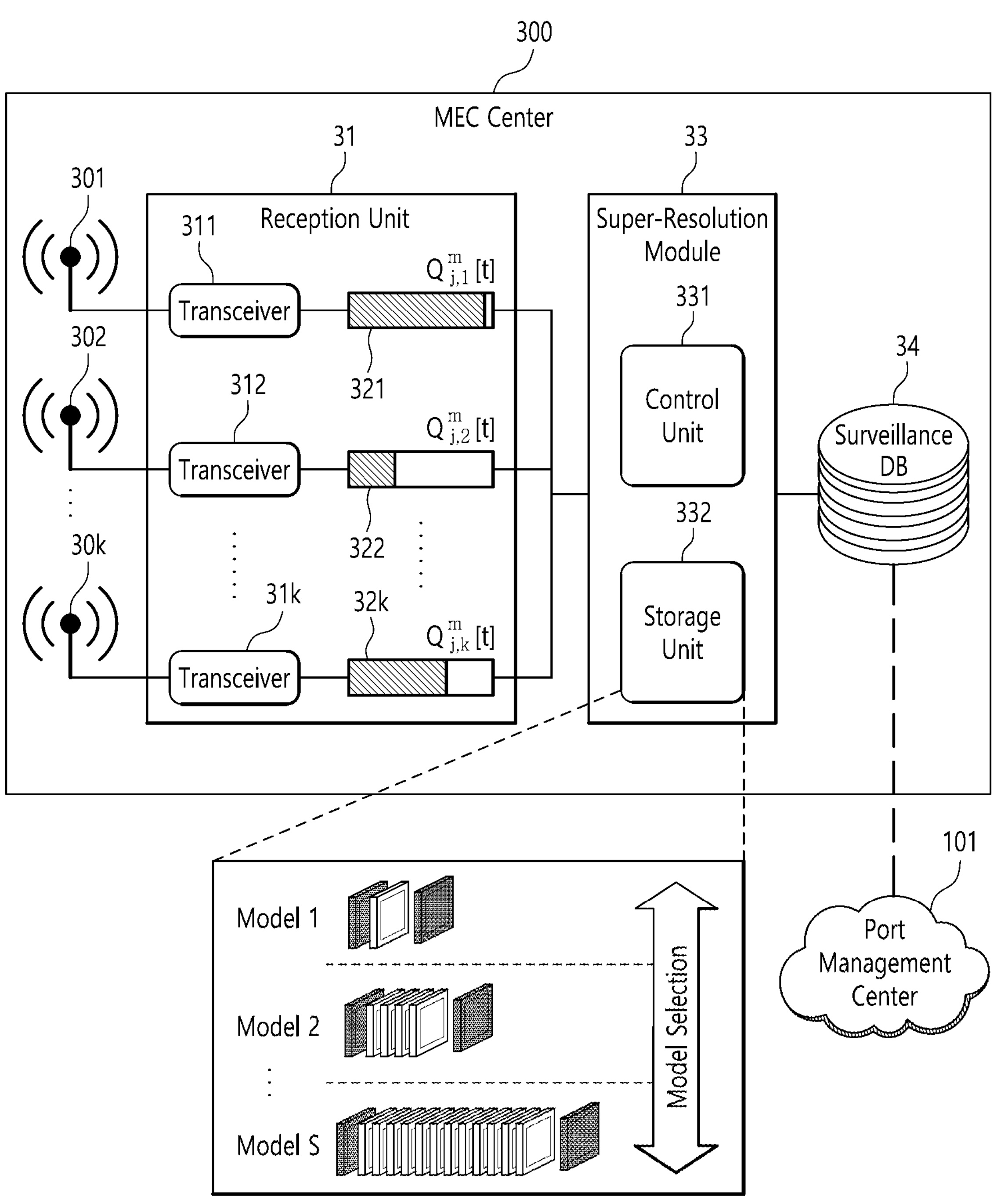
FIG. 3 is a schematic block diagram of a mobile edge computing (Multi-Access Edge Computing; MEC) center in a deep learning-based super-resolution image processing system according to an embodiment.

FIG. 3 is a schematic block diagram of the MEC center in the deep learning-based super-resolution image processing system according to an embodiment.

Referring to FIG. 3, the MEC center 300 includes a receiving unit 31 and a super-resolution module 33. The receiving unit 31 includes one or more transceivers 311-31*k* each having a reception queue 321-32*k* and receives image data from the unmanned aerial vehicle system. Each transceiver 311-31*k* may receive data through a radio channel using an antenna 301-30*k*.

The super-resolution module 33 may generate a super-resolution image through a super-resolution deep neural network computation (that is, deep learning computation) for the image data received by the receiving unit 31. In one embodiment, the super-resolution module 33 may include a storage unit 332 in which a plurality of super-resolution models are stored and a control unit 331 configured to select a model to be applied from among the super-resolution models stored in the storage unit 332.

In one embodiment, the MEC center 300 further includes a surveillance database (DB) 34 configured to store surveillance information including super-resolution images generated by the super-resolution module 33. The surveillance database 34 is configured to interwork with other devices such as the port management center 101 in the environment to which the super-resolution image processing system according to the present embodiment is applied or to provide surveillance information to these devices, and thus allowing the port management center 101 and the like to perform observation and monitoring of the target area based on the super-resolution image.

Figure 4B:
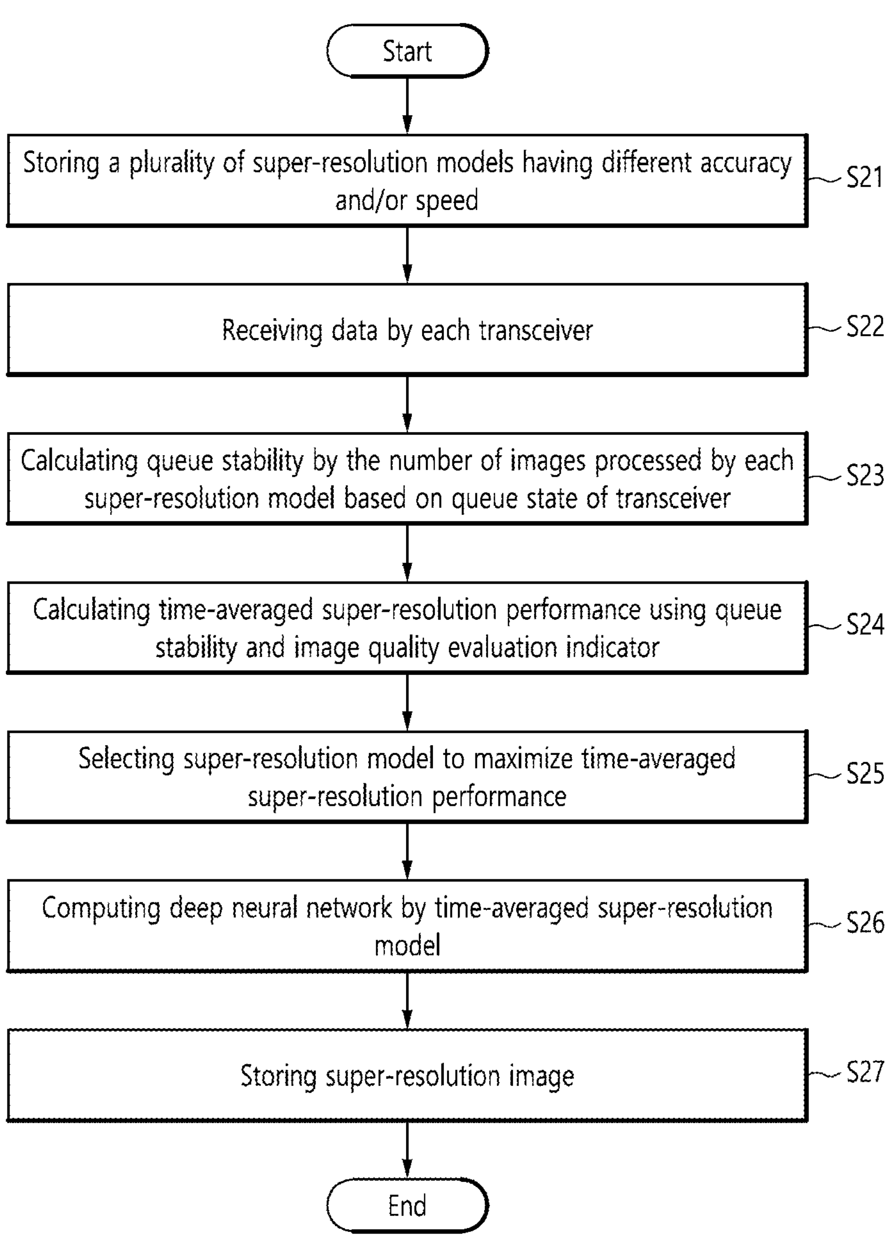
FIG. 4B is a flowchart illustrating each step of a process in which the MEC center applies a super-resolution model to image data in a deep learning-based super-resolution image processing method according to an embodiment.

FIG. 4B is a flowchart illustrating each step of a process in which the MEC center applies a super-resolution model to image data in a deep learning-based super-resolution image processing method according to an embodiment.

Referring to FIGS. 3 and 4B, first, a plurality of super-resolution models having different accuracy and/or speed may be stored in the storage unit 332 of the MEC center 300 (S21). For example, the plurality of super-resolution models stored in the storage unit 332 are for performing super-resolution for image data through a deep neural network (that computation is, deep learning computation), but the super-resolution models may be different in the number of the hidden layers. A super-resolution model with the small number of hidden layers processes a relatively shallow level of deep neural network computation, and as a result, the processing speed increases, but the quality of super-resolution decreases. Conversely, the super-resolution model with the many number of hidden layers improves the quality of super-resolution, but the processing speed is slow and thus a long processing time is required.

On the other hand, the receiving unit 31 of the MEC center 300 may receive image data which is surveillance information from an unmanned aerial vehicle system (or, for simplicity, also referred to as a drone) (S22). For example, the receiving unit 31 includes one or more transceivers 311-31*k* that operate using one or more antennas 301-30*k*, respectively and may be configured to wait for image processing by the super-resolution module 33 by assigning image data received through the transceivers 311-31*k* to the backlog of the reception queue 321-32*k* of each transceiver 311-31*k*. Wherein, the MEC center 300 may be communicatively connected to a plurality of unmanned aerial vehicle systems based on the number of antennas 301-30*k* and transceivers 311-31*k*.

Super-resolution module 33 performs super-resolution deep neural network computation for image data loaded in the backlog of the reception queue 321-32*k* of each transceiver 311-31*k* based on a plurality of super-resolution models stored in the storage unit 332. Since deep neural network computation requires high computational power, the processing speed of the super-resolution module 33 may change from time to time and for this reason, in one embodiment of the present invention, a super-resolution model is selected from among a plurality of super-resolution models stored in the storage unit 332 in an adaptive manner based on the free space of the reception queues 321-32*k* (S23-S25), and for the image data loaded in the backlog of each reception queue 321-32*k*, a deep neural network computation using the selected super-resolution model may be performed (S26).

Specifically, in one embodiment of the present invention, a super-resolution model is selected through Lyapunov optimization. Lyapunov optimization is a way of obtaining the optimal value of the time average of the corresponding expression within the bounds of guaranteeing the stability of the queue when there is an objective function to be minimized. In an embodiment of the present invention, the Lyapunov optimization is applied to the selection of the super-resolution model, to thereby maximize the use of resources of the super-resolution image processing system while preventing overflow of the reception queues 321-32*k*.

The control unit 331 makes a decision to select one super-resolution model from among the super-resolution models stored in the storage unit 332 at each unit time. At this time, since the processing of image data in the corresponding queue 321-32*k* is more urgent as the backlog of the reception queue 321-32*k* approaches overflow, the control unit 331 can secure only a certain amount of accuracy and then select a super-resolution model that is relatively shallow (that is, having a small number of hidden layers) in order to accelerate the processing. In other word, a super-resolution model that is simple and fast in processing speed but has low super-resolution accuracy can be selected. On the other hand, when the backlog of the reception queue 321-32*k* is close to 0, there is no need to seriously consider stability in this unit time and therefore, it is possible to use a sophisticated model that is high in accuracy but slow in speed by selecting a super-resolution model that is a relatively deep (that is, having a large number of hidden layers) in order to increase effectiveness.

As described above, in order to select a super-resolution model for dispersion, self-control and stabilization control while maximizing super-resolution performance, the control unit 331 in one embodiment is configured to maximize the value of the Lyapunov drift which is an equation defined using queues 321-32*k* and determine a super-resolution model to use in the next time unit. First, the queue state of the k-th transceiver of MEC-j to which Lyapunov optimization is applied can be defined as Equation 2.

$$Q^m_{j,k}[t+1] = \max\{Q^m_{j,k}[t] - \mu^m_{j,k}(\alpha_{j,k}[t], t), 0\} + \lambda^m_{j,k}[t], \quad Q^m_{j,k}[0] = 0 \qquad \text{Equation 2}$$

wherein, $$Q^m_{j,k}[t]$$

represents the backlog size of the queue 32*k* of the k-th transceiver 31*k* of MEC-j. Also, $$\mu^m_{j,k}(\alpha_{j,k}[t], t)$$

represents the number of images processed in $$Q^m_{j,k}[t]$$

through the super-resolution model $\alpha_{j,k}^{[t]}$ for data received through the k-th transceiver 31*k* of the MEC-j. Also, $$\lambda^m_{j,k}[t]$$

means the number of image data randomly arriving at the queue 32*k* of the k-th transceiver 31*k* of the MEC-j from the unmanned aerial vehicle system through a radio channel.

As shown in Equation 2, the super-resolution model $\alpha_{j,k}^{[t]}$ acts to control the backlog $$Q^m_{j,k}[t]$$

of the queue 32*k* of the k-th transceiver 31*k* of MEC-j, and can also control the process of data processing of $$Q^m_{j,k}[t]$$

by selecting the super-resolution model $\alpha_{j,k}^{[t]}$ in unit time t. In an embodiment of the present invention, $\alpha_{j,k}^{[t]}$ is controlled according to $$Q^m_{j,k}[t]$$

in order to maximize the time-averaged super-resolution performance that is affected by stability.

To this end, first, the equation for maximizing the time-averaged super-resolution performance can be defined as in Equation 3 below.

$$\max: \lim_{t\to\infty} \sum_{\tau=0}^{t-1} P_{j,k}(\alpha_{j,k}[\tau], \tau), \ \forall j \in \mathcal{M}, \forall k \in \mathcal{K}_j \qquad \text{Equation 3}$$

wherein, $P_{j,k}(\alpha_{j,k}[\tau],\tau)$ represents the value of quality evaluation when a super-resolution model has been applied to image data. In one embodiment, $P_{j,k}(\alpha_{j,k}[\tau],\tau)$ may be calculated as a peak-signal-to-noise-ratio (PSNR) value, which is one of well-known image quality evaluation indicators, but is not limited thereto.

On the other hand, when the super-resolution model currently selected in the k-th transceiver 31*k* of MEC-j is $\alpha_{j,k}[\tau]$ queue stability may be defined as in Equation 4 below (S23).

$$\lim_{t\to\infty} \frac{1}{t} \sum_{\tau=0}^{t-1} Q^m_{j,k}[t] < \infty, \ \forall j \in \mathcal{M}, \forall k \in \mathcal{K}_j. \qquad \text{Equation 4}$$

wherein, in one embodiment, Equations 3 and 4 may be reconstructed as Equation 5 below in order to maximize a time-averaged super-resolution performance affected by queue stability in accordance with Lyapunov optimization (S24).

$$\alpha^*_{j,k}[t] \leftarrow \arg\max_{\alpha_{j,k}[t]\in\mathcal{A}} \{V \cdot P_{j,k}(\alpha_{j,k}[t], t) + Q^m_{j,k}[t] \cdot \mu^m_{j,k}(\alpha_{j,k}[t], t)\} \qquad \text{Equation 5}$$

In Equation 5, A means a set of all super-resolution models stored in the storage unit 332. In addition, V is a constant representing a trade-off between super-resolution performance and queue stability and may be appropriately set according to an embodiment of the present invention. By determination a super-resolution model in which the Lyapunov drift defined by the above Equation 5 is maximized, it is possible to select a super-resolution model so as to maximize the time-averaged performance in each unit time (S25).

For example, it is assumed that $$\alpha^*_{j,k}[t],\ \alpha_{j,k}[t],\ Q^m_{j,k}[t],\ P_{j,k}(\alpha_{j,k}[t], t),$$

$$\mu^m_{j,k}(\alpha_{j,k}[t], t)$$

in Equation 5 are simply expressed as α-[t], α[t], Q[t], P(α[t]), $\mu_\alpha$[t], respectively and the reception queues 321-32*k* are in an idle state. In this case, since the usage of queues (321-32*k*) is close to 0, Q[t] can be calculated as 0 and therefore, Equation 5 can be expressed as Equation 6 below.

$$\begin{aligned}\alpha^*[t] &\leftarrow \arg\max_{\alpha[t]\in\mathcal{A}}\{V\cdot P(\alpha[t]) + 0\cdot\mu_\alpha[t]\} \\ &= \arg\max_{\alpha[t]\in\mathcal{A}} V\cdot P(\alpha[t])\end{aligned} \qquad \text{Equation 6}$$

Equation 6 means that α[t] capable of maximizing the super-resolution quality P(α[t]) in a state where Q[t] is close to 0 is selected and $\mu_\alpha$[t] represents the number of quality-enhanced images generated through the super-resolution model α[t] selected at time t. It is clear that a deeper super-resolution model maximizes the resolution and therefore, it can be seen that by applying the selection of a super-resolution model according to this embodiment when the backlog is in the idle state, the deepest deep neural network model is used for super-resolution, resulting in maximized performance.

As an another example, when usage of the queue (321-32*k*) is high, for example, when the queue (321-32*k*) is on the verge of overflow, Q[t]≈∞ can be calculated, wherein the equation 5 can be expressed as Equation 7 below.

$$\begin{aligned}\alpha^*[t] &\leftarrow \arg\max_{\alpha[t]\in\mathcal{A}}\{V\cdot P(\alpha[t]) + \infty\cdot\mu_\alpha[t]\} \\ &\approx \arg\max_{\alpha[t]\in\mathcal{A}} \mu_\alpha[t]\end{aligned} \qquad \text{Equation 7}$$

The above equation 7 means that because it is advantageous to select the fastest model in terms of processing time to prevent overflow when the queues 321-32*k* are in a state immediately before overflow, a super-resolution model capable of maximizing $\mu_\alpha$[t] is selected from among super-resolution models stored in the storage unit 332 In image models. In this case, it can be seen that in general, the simplest model, that is, a shallow model (with a small number of hidden layers) is applied so that although the super-resolution performance is not good, the best choice is made in terms of processing speed.

Therefore, it is possible to select a super-resolution model so as to maximize the time-averaged super-resolution performance according to the time stability at every unit time t while observing the backlog $$Q^m_{j,k}[t]$$

of the queue 32*k* of the k-th transceiver 31*k* of MEC-j based on the above-described Equation 5 (S25).

As described above, the super-resolution module 33 can select a super-resolution model in a way to maximize the time-averaged super-resolution performance and generate a super-resolution image through a deep neural network computation by the selected super-resolution model (S26).

In one embodiment, the super-resolution module 33 may store the generated super-resolution image in the surveillance DB 34 (S27).

The super-resolution image stored in the surveillance DB 34 is provided to other devices or servers such as the port management center of the smart logistics system within the environment to which the super-resolution image processing system according to the present embodiment is applied, allowing the surveillance area of the unmanned aerial vehicle communicating with the MEC center (300) to be observed and monitored based on the stored super-resolution.

Table 1 shows the queue stability performance according to an embodiment of the present invention as an experimental result in which the data transmission situation between the drone and the MEC center is set as a scenario and the number of overflows occurring in the backlogs of both the drone and the MEC center during works done in 100,000 unit hours have been observed and evaluated.

TABLE 1

| Scheduling | Frequency (%) | Comparison |
|---|---|---|
| Random scheduling | 27.89 | 8.63 |
| Drone-queue-greedy scheduling | 10.54 | 3.26 |
| Max-weight scheduling of the present invention | 3.32 | — |

Referring to Table 1, when evaluating the results of the embodiment of the present invention to which max-weight scheduling has been applied through the comparison with random scheduling and drone-queue-greedy scheduling, as shown in Table 1, the probability of occurrence of an overflow situation is 8.63 times and 3.26 times higher in random scheduling and drone-queue-greedy scheduling respectively than in the embodiment of the present invention. Therefore, it can be confirmed that the transmission algorithm considering the queue backlog of the MEC center according to an embodiment of the present invention is superior to conventional technologies in terms of stability.

Figure 5:
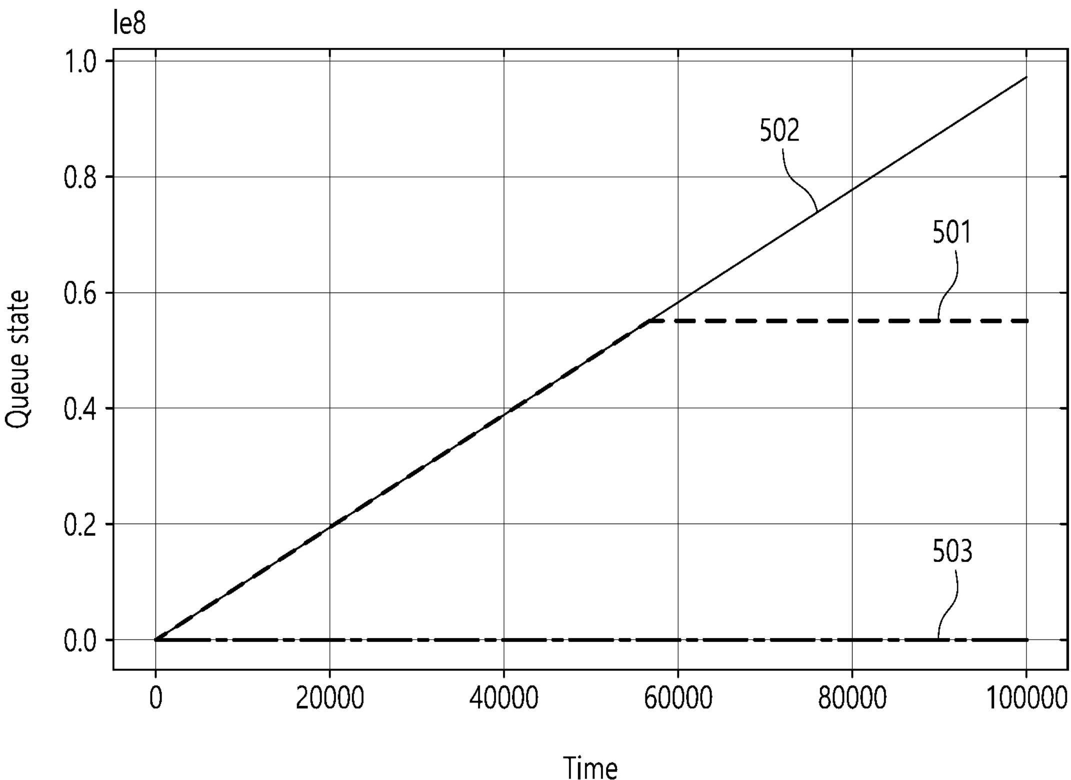
FIG. 5 is a graph showing a state of the queue backlog in a MEC center according to a super-resolution model selection of a deep learning-based super-resolution image processing method according to an embodiment.
Figure 6A:
FIGS. 6A to 9B are images illustrating performance of a deep learning-based super-resolution image processing method according to embodiments.
Figure 6B:
Figure 7A:
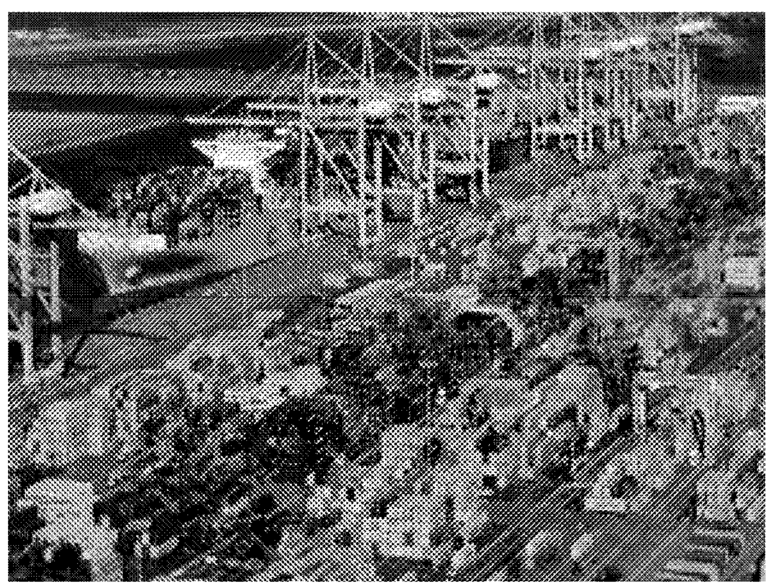
Figure 7B:
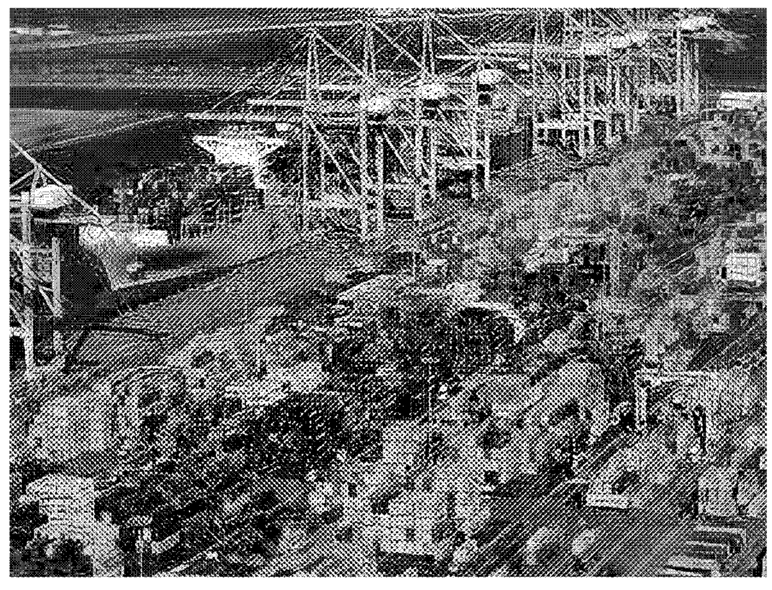
Figure 8A:
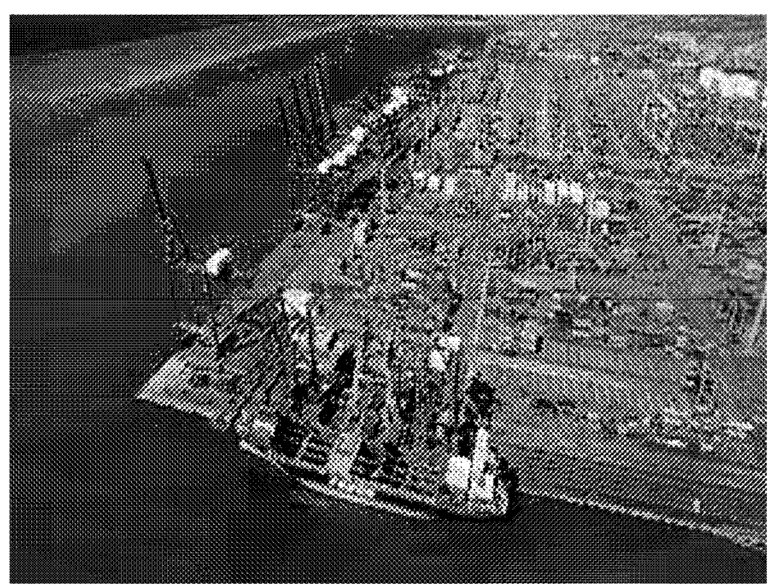
Figure 8B:
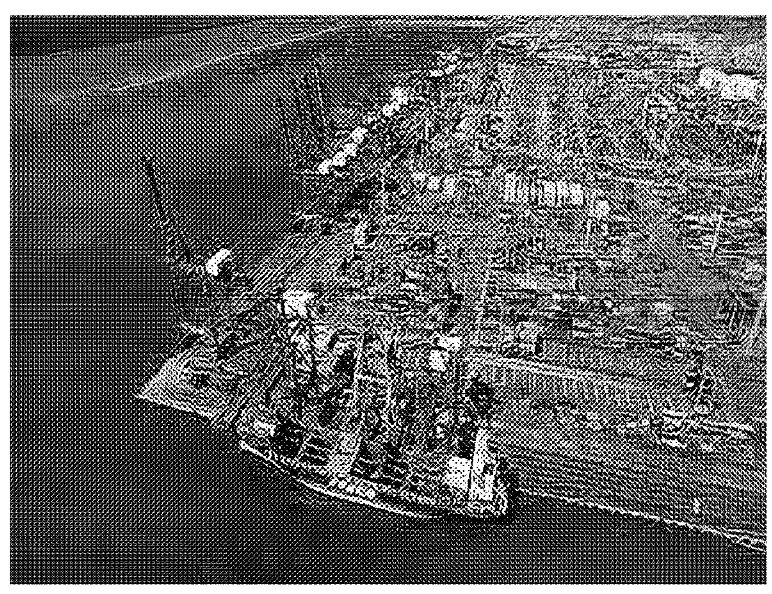
Figure 9A:
Figure 9B:

FIG. 5 is a graph showing a state of the queue backlog in a MEC center according to a super-resolution model selection of a deep learning-based super-resolution image processing method according to an embodiment.

In the graph of FIG. 5, the horizontal axis represents a unit time and the vertical axis represents a queue state. As shown, the closer the value is to 1, the more the backlog is full.

In addition, in the graph of FIG. 5, a dashed-dot line 503 indicates a case where only a shallow super-resolution model (that is, having relatively small number of hidden layers) is applied, a solid line 501 indicates a case where only a deep super-resolution model (that is, having relatively large number of hidden layers) is applied, and a dotted line 502 indicates a case where a self-control and stabilization control model using Lyapunov optimization is used according to an embodiment of the present invention. As shown in FIG. 5B, when only the deep super-resolution model is applied, there is a problem that the overflow situation cannot be handled and resultantly the backlog is full, while when only the shallow super-resolution model is used, the processing speed is fast and resultantly the backlog is always empty, but it is not good in terms of super-resolution performance.

In one embodiment of the present invention, by allowing a certain amount of delay to improve the super-resolution quality, it follows a deep model because the backlog is idle in the initial stage, but when the backlog reaches a certain amount of data corresponding to a threshold, the self-adaptive control is initiated and starts selecting a super-resolution model that can handle the delay. Therefore, it can be seen that the way of selecting the super-resolution model according to an embodiment of the present invention is superior to the two conventional static control ways in terms of management of queue states and image quality.

FIGS. 6 to 9 are diagrams for explaining the performance of the super-resolution deep learning model according to an embodiment of the present invention as experimental results, and represent super-resolution computation results using actual port images.

The images of FIGS. 6A, 7A, 8A and 9A represent relatively low-resolution images before super-resolution processing, and these images have been obtained by bicubic interpolation. Meanwhile, the images of FIGS. 6B, 7B, 8B and 9B represent super-resolution images obtained by applying a super-resolution model to the images of FIGS. 6A, 7A, 8A, and 9A, respectively.

As shown, it can be confirmed that image quality is improved by the deep learning-based super-resolution image processing method according to embodiments of the present invention and the higher the number of hidden layers, the better the performance.

The operation by the deep learning-based super-resolution image processing method according to the embodiments described above may be at least partially implemented by a computer program and recorded on a computer-readable recording medium.

A computer-readable recording medium on which programs for implementing operations by a deep learning-based super-resolution image processing method according to the embodiments are recorded includes all types of recording devices in which data readable by a computer is stored. Examples of computer-readable recording medium include ROM, RAM, CD-ROM, magnetic tape, floppy disk, optical data storage devices and the like. In addition, computer-readable recording medium may be distributed in computer systems connected through a network, and computer-readable codes may be stored and executed in a distributed manner. Also, functional programs, codes and code segments for implementing this embodiment can be easily understood by those skilled in the art to which the embodiments belong.

The present invention described above has been described with reference to the embodiments shown in the drawings, but this is only exemplary, and those skilled in the art will understand that various modifications and variations of the embodiments are possible therefrom. However, such modifications should be considered within the technical protection scope of the present invention. Therefore, the true technical protection scope of the present invention should be determined by the technical spirit of the appended claims.

The invention claimed is:

1. A deep learning-based super-resolution image processing system, comprises:

an unmanned aerial vehicle system configured to receive an image captured by an unmanned aerial vehicle and allocate image data corresponding to the image to a transmission queue; and a mobile edge computing (MEC) center including one or more transceivers, each transceiver having a respective reception queue, the MEC center being configured to receive the image data from the unmanned aerial vehicle system through the one or more transceivers, and generate a super-resolution image corresponding to the image data through a deep learning computation based on a super-resolution model, wherein the unmanned aerial vehicle system is configured to determine which of the one or more transceivers to transmit the image data based on a difference between an amount of data in the transmission queue and an amount of data in the reception queue of each of the one or more transceivers.

2. The system according to claim 1, wherein the unmanned aerial vehicle system includes:

an input unit configured to receive the image from a photographing means; and a transmission unit including the transmission queue and configured to determine which transceiver to transmit the image data by means of a scheduling using a difference between the amount of data in a backlog of the transmission queue and the amount of data in a backlog of the reception queue as a weight.

3. The system according to claim 2, wherein the unmanned aerial vehicle system further includes a layering unit configured to generate the image data to be allocated to the transmission queue through layering for the image received by the input unit.

4. The system according to claim 1, wherein the MEC center includes a super-resolution module configured to determine a super-resolution model to be applied to the image data received through the reception queue based on a free space of the reception queue, and generate the super-resolution image using the determined super-resolution model.

5. The system according to claim 4, wherein the super-resolution module includes:

a storage unit configured to store a plurality of super-resolution models that differ in at least one of processing speed and processing quality; and a control unit configured to determine which super-resolution model to be applied to the image data from among the plurality of super-resolution models so as to maximize time-averaged super-resolution performance for the image data.

6. The system according to claim 5, wherein the control unit is further configured to determine which super-resolution model to apply to the image data such that a time-averaged super-resolution performance defined by Lyapunov optimization is maximized using a quality evaluation value when the super-resolution model is applied to the image data and a queue stability value of the reception queue.

7. A deep learning-based super-resolution image processing method, comprising:

receiving, by an unmanned aerial vehicle system, a captured image;

allocating, by the unmanned aerial vehicle system, image data corresponding to the captured image to a transmission queue;

receiving, by the unmanned aerial vehicle system, state information of reception queues respectively associated with one or more transceivers of a mobile edge computing (MEC) center;

determining, by the unmanned aerial vehicle system, which of the one or more transceivers to transmit the image data based on a difference between an amount of data in the transmission queue and an amount of data in a reception queue of each transceiver; and transmitting, by the unmanned aerial vehicle system, the image data to the determined transceiver.

8. The method according to claim 7, wherein the determining of which of the one or more transceivers to transmit the image data includes scheduling using the difference between the amount of data in a backlog of the transmission queue and the amount of data in a backlog of the reception queue as a weight.

9. The method according to claim 7 further comprising:

prior to allocating the image data to the transmission queue, generating, by the unmanned aerial vehicle system, the image data to be assigned to the transmission queue through layering for the captured image.

10. A non-transitory computer-readable recording medium storing instructions that, when executed by one or more processors, cause the one or more processors to perform the method of claim 7.

11. A deep learning-based super-resolution image processing method, comprising:

receiving, by a mobile edge computing (MEC) center including one or more transceivers each having a reception queue, image data from an unmanned aerial vehicle system;

selecting, by the MEC center, a super-resolution model from a plurality of super-resolution models that differ in at least one of processing speed and processing quality, based on free space of the reception queue; and generating, by the mobile edge computing center, a super-resolution image corresponding to the image data through a deep learning computation using the selected super-resolution model.

12. The method according to claim 11 further comprising:

storing the plurality of super-resolution models that differ in at least one of processing speed and processing quality in the MEC center, wherein the selecting of the super-resolution model to be applied to the image data includes selecting by the MEC center a super-resolution model to be applied to the image data from among the plurality of super-resolution models so as to maximize a time-averaged super-resolution performance for the image data.

13. The method according to claim 12, wherein the selecting of the super-resolution model to be applied to the image data from among the plurality of super-resolution models includes selecting, by the mobile edge computing center, a super-resolution model maximizing the time-averaged super-resolution performance defined by Lyapunov optimization using a quality evaluation value and a queue stability value of the reception queue when the super-resolution model has been applied to the image data.

* * * * *